US012148298B2

(12) United States Patent
McLaine et al.

(10) Patent No.: US 12,148,298 B2
(45) Date of Patent: Nov. 19, 2024

(54) SYSTEM AND METHOD FOR PROVIDING PLATOONING INFORMATION USING AN AUGMENTED REALITY DISPLAY

(71) Applicant: GM Global Technology Operations LLC, Detroit, MI (US)

(72) Inventors: Joseph Philip McLaine, Troy, MI (US); Joseph F. Szczerba, Grand Blanc, MI (US); John P. Weiss, Shelby Township, MI (US); Thomas A. Seder, Fraser, MI (US); Kai-Han Chang, Madison Heights, MI (US); Steven Landry, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 295 days.

(21) Appl. No.: 17/711,476

(22) Filed: Apr. 1, 2022

(65) Prior Publication Data

US 2023/0316914 A1    Oct. 5, 2023

(51) Int. Cl.
*G08G 1/133*      (2006.01)
*B60K 35/00*      (2024.01)
(Continued)

(52) U.S. Cl.
CPC .......... *G08G 1/133* (2013.01); *B60K 35/00* (2013.01); *G02B 27/0101* (2013.01);
(Continued)

(58) Field of Classification Search
CPC .......... G08G 1/133; G08G 1/093; G08G 1/20; G08G 1/22; B60K 35/00; B60K 35/22;
(Continued)

(56) References Cited

U.S. PATENT DOCUMENTS

| 10,510,276 B1 * | 12/2019 | Lee .................... B60K 35/00 |
| 2014/0362195 A1 * | 12/2014 | Ng-Thow-Hing ..... G06V 40/20 |
| | | 348/51 |

(Continued)

FOREIGN PATENT DOCUMENTS

| DE | 102014214514 A1 * | 1/2016 | .......... G05D 1/0287 |
| DE | 102019220553 A1 * | 6/2021 | |

(Continued)

OTHER PUBLICATIONS

English Translation for DE-102014214514-A1 (Year: 2016).*
(Continued)

*Primary Examiner* — Faris S Almatrahi
*Assistant Examiner* — Moises Gasca Alva
(74) *Attorney, Agent, or Firm* — Vivacqua Crane, PLLC

(57) ABSTRACT

A method is designed to provide platooning information using a multi-focal plane augmented reality display of a host vehicle. The method includes receiving platooning data from at least one of a plurality of remote vehicles. Each of the plurality of remote vehicle is part of a platoon. The platooning data includes locations, trajectories, and headways of each of the plurality of remote vehicles. The method further includes determining whether the platoon is within a predetermined distance from the host vehicle using the platooning data. Further, the method includes transmitting a command signal to the multi-focal plane augmented reality display of the host vehicle to display a virtual image on the multi-focal plane augmented reality display. The virtual image is indicative of a platooning action related to the platoon that is within the predetermined distance from the host vehicle.

17 Claims, 10 Drawing Sheets

(51) Int. Cl.
| | |
|---|---|
| *B60K 35/22* | (2024.01) |
| *B60K 35/28* | (2024.01) |
| *G02B 27/01* | (2006.01) |
| *G06F 3/01* | (2006.01) |
| *G06F 3/14* | (2006.01) |
| *G08G 1/00* | (2006.01) |
| *G08G 1/09* | (2006.01) |

(52) U.S. Cl.
CPC .............. *G06F 3/013* (2013.01); *G06F 3/14* (2013.01); *G08G 1/093* (2013.01); *G08G 1/20* (2013.01); *G08G 1/22* (2013.01); *B60K 35/22* (2024.01); *B60K 35/28* (2024.01); *B60K 2360/177* (2024.01); *G02B 2027/0141* (2013.01)

(58) Field of Classification Search
CPC .............. B60K 35/28; B60K 2360/177; G02B 27/0101; G02B 2027/0141; G06F 3/013; G06F 3/14; G06F 3/011; G06F 3/012; G09G 2380/10

See application file for complete search history.

(56) References Cited

U.S. PATENT DOCUMENTS

| | | | | |
|---|---|---|---|---|
| 2016/0163200 | A1* | 6/2016 | He | G08G 1/22 701/117 |
| 2019/0084566 | A1* | 3/2019 | Park | G05D 1/0287 |
| 2019/0096265 | A1* | 3/2019 | Mok | G08G 1/22 |
| 2019/0392091 | A1* | 12/2019 | Kliemann | G06F 30/20 |
| 2020/0250969 | A1* | 8/2020 | Wang | G01C 21/3697 |
| 2022/0107497 | A1* | 4/2022 | Murata | B60K 35/29 |
| 2022/0415179 | A1* | 12/2022 | Kumar | H04W 4/46 |

FOREIGN PATENT DOCUMENTS

| | | | | |
|---|---|---|---|---|
| EP | 3128356 | A1 * | 2/2017 | ............ B60K 35/00 |
| KR | 102395844 | B1 * | 5/2022 | |

OTHER PUBLICATIONS

English Translation for DE-102019220553-A1 (Year: 2021).*
English Translation for EP-3128356-A1 (Year: 2017).*
English Translation for KR-102395844-B1 (Year: 2022).*
On-Road Automated Driving (ORAD) Committee, Taxonomy and Definitions for Terms Related to Cooperative Driving Automation for On-Road Motor Vehicles, SAE International, Jul. 2021, pp. 1-19, J3216, Downloaded from SAE International by GM eLibrary, Wednesday, Mar. 16, 2022.
On-Road Automated Driving (ORAD) Committee, Taxonomy and Definitions for Terms Related to Cooperative Driving Automation for On-Road Motor Vehicles, SAE International, May 2020, pp. 1-20, J3216, Downloaded from SAE International by GM eLibrary, Wednesday, Mar. 16, 2022.

* cited by examiner

SYSTEM AND METHOD FOR PROVIDING PLATOONING INFORMATION USING AN AUGMENTED REALITY DISPLAY

INTRODUCTION

The present disclosure relates to a system and method for providing platooning information using a multi-focal plane augmented reality display.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Some vehicles include displays to provide information to a vehicle user. However, these displays do not necessarily present information relating to platooning. In the present disclosure, the term "platooning" means a method of autonomously driving a group of vehicles together to a common destination. In the present disclosure, the term "platoon" means a plurality of remote vehicles driven together autonomously to a common destination. Providing platooning information may help the vehicle user enter or exit a platoon (i.e., a string of vehicles) heading to a specific destination. In the present disclosure, the term "platooning information" means information about platooning. It is desirable to develop a system and a method for providing platooning information using a multi-focal plane augmented reality display of a vehicle based on real-time vehicle positioning.

SUMMARY

The present disclosure describes a system and method for providing platooning information using a multi-focal plane augmented reality display of a host vehicle. In an aspect of the present disclosure, the method includes receiving platooning data from at least one of a plurality of remote vehicles. Each of the plurality of remote vehicle is part of a platoon. The platooning data includes locations, trajectories, and headways of each of the plurality of remote vehicles. The method further includes determining whether the platoon is within a predetermined distance from the host vehicle using the platooning data. The method also includes, in response to determining that the platoon is within the predetermined distance from the host vehicle using the platooning data, transmitting a command signal to the multi-focal plane augmented reality display of the host vehicle to display a virtual image on the multi-focal plane augmented reality display. The virtual image is indicative of a platooning action related to the platoon that is within the predetermined distance from the host vehicle. The method described in this paragraph improves vehicle technology by providing the vehicle user of the host vehicle advance notice of possible platooning actions relating to nearby platoons while still allowing the vehicle user to have a view of the outside world.

In an aspect of the present disclosure, the virtual image is indicative that the host vehicle is leading the platoon.

In an aspect of the present disclosure, the virtual image is indicative that the host vehicle is participating in the platoon.

In an aspect of the present disclosure, the virtual image is indicative of a final destination of the platoon.

In an aspect of the present disclosure, the virtual image is indicative of a platooning action that will be performed by each of the plurality of remote vehicles.

In an aspect of the present disclosure, the platooning action is that each of the plurality of remote vehicles of the platoon will change lanes.

In an aspect of the present disclosure, the platooning action is that the host vehicle will close a gap between the host vehicle and one of the plurality of remote vehicles that is directly in front of the host vehicle.

In an aspect of the present disclosure, the platooning action is that the host vehicle will open a gap between the host vehicle and one of the plurality of remote vehicles that is directly in front of the host vehicle.

In an aspect of the present disclosure, the virtual image is indicative that the platoon is private and the host vehicle is not allowed to join the platoon.

In an aspect of the present disclosure, the virtual image includes a query, and the query asks a vehicle user of the host vehicle whether the vehicle user wants to join the platoon.

In an aspect of the present disclosure, the virtual image includes a query, and the query asks a vehicle user of the host vehicle whether the vehicle user wants to exit the platoon.

In an aspect of the present disclosure, the virtual image includes a text indicating time savings associated with joining the platoon.

In an aspect of the present disclosure, the virtual image includes a text indicating cost savings associated with joining the platoon.

In an aspect of the present disclosure, the method further includes determining a location of eyes of a vehicle user of the host vehicle and determining a location of the virtual image based on the location of the eyes of the vehicle user. Transmitting the command signal to the multi-focal plane augmented reality display includes commanding the multi-focal plane augmented reality display of the host vehicle to display the virtual image at the location determined based on the location of the eyes of the vehicle user.

In an aspect of the present disclosure, the method further includes receiving a vehicle-user goal data from a vehicle user of the host vehicle. The vehicle-user goal data includes information about a goal of the vehicle user of the host vehicle. The method further includes, in response to determining that the platoon is within the predetermined distance from the host vehicle using the platooning data, determining whether performing the platooning action is consistent with the goal of the vehicle user of the host vehicle. The virtual image is indicative of the platooning action. The method further includes, in response to determining that platooning action is consistent the goal of the vehicle user, commanding the multi-focal plane augmented reality display of the host vehicle to display the virtual image. The virtual image includes a query asking the vehicle user whether to perform the platooning action.

In an aspect of the present disclosure, the method further includes, after transmitting the command signal to the multi-focal plane augmented reality display of the host vehicle to display the virtual image on the multi-focal plane augmented reality display, determining whether the host vehicle has completed the platooning action. The method further includes, in response to determining that the host vehicle has completed the platooning action, transmitting an off signal to the multi-focal plane augmented reality display to discontinue showing the virtual image on the multi-focal plane augmented reality display.

The present disclosure also describes to a system for providing platooning information in a host vehicle. In an aspect of the present disclosure, the system includes a transceiver configured to receive platooning data from at least one of a plurality of remote vehicles. Each of the plurality of remote vehicle is part of a platoon, the platooning data includes locations, trajectories, and headways of each of the plurality of remote vehicle. The system further includes a multi-focal plane augmented reality display configured to display a virtual image. The system further includes a controller in communication with the transceiver and the multi-focal plane augmented reality display. The controller is configured to: receive the platooning data; determine whether the platoon is within a predetermined distance from the host vehicle using the platooning data; and in response to determining that the platoon is within the predetermined distance from the host vehicle using the platooning data, transmit a command signal to the multi-focal plane augmented reality display of the host vehicle to display the virtual image on the multi-focal plane augmented reality display, wherein the virtual image is indicative of the platoon. The system described in this paragraph improves vehicle technology by providing the vehicle user of the host vehicle advance notice of possible platooning actions relating to nearby platoons while still allowing the vehicle user to have a view of the outside world.

In an aspect of the present disclosure, the system further includes a user tracker configured to track a location of eyes of a vehicle user of the host vehicle. The controller is configured to: determine a location of eyes of the vehicle user of the host vehicle; determine a location of the virtual image based on the location of the eyes of the vehicle user; and command the multi-focal plane augmented reality display of the host vehicle to display the virtual image at the location determined based on the location of the eyes of the vehicle user.

In an aspect of the present disclosure, the system further includes a user interface. The controller is configured to: receive a vehicle-user goal data from a vehicle user of the host vehicle via the user interface. The vehicle-user goal data includes information about a goal of the vehicle user of the host vehicle. The controller is further configured to, in response to determining that the platoon is within the predetermined distance from the host vehicle using the platooning data, determine whether performing a platooning action is consistent the goal of the vehicle user, wherein the virtual image is indicative of the platooning action. The controller is further configured to, in response to determining that platooning action is consistent the goal of the vehicle user of the host vehicle, command the multi-focal plane augmented reality display of the host vehicle to display the virtual image. The virtual image includes a query asking the vehicle user whether to perform the platooning action.

In an aspect of the present disclosure, the controller is configured to, after transmitting the command signal to the multi-focal plane augmented reality display of the host vehicle to display the virtual image on the multi-focal plane augmented reality display, determine whether the host vehicle has completed the platooning action. The controller is further configured to, in response to determining that the host vehicle has completed the platooning action, transmit an off signal to the multi-focal plane augmented reality display to discontinue showing the virtual image on the multi-focal plane augmented reality display.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
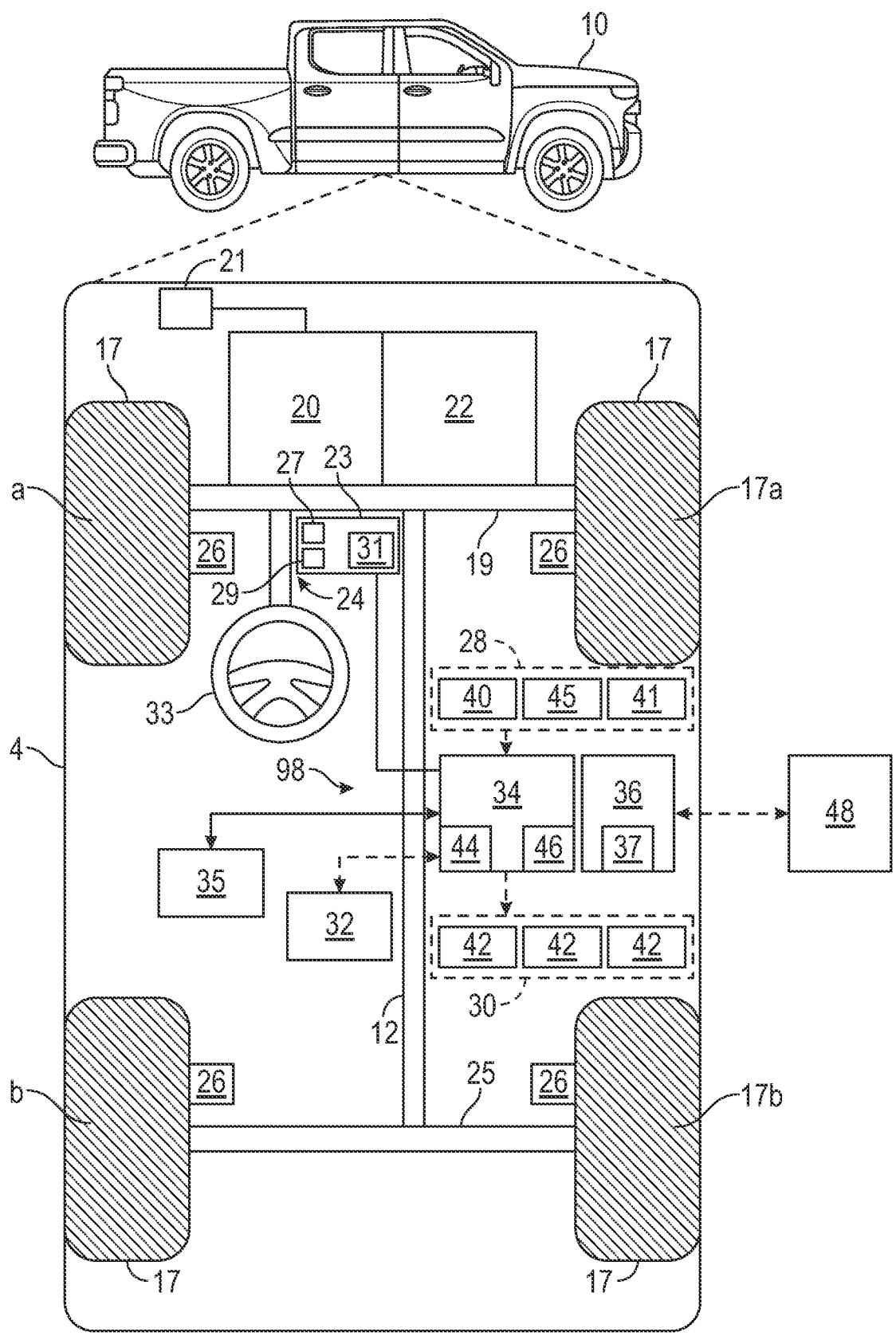
FIG. 1 is a block diagram depicting an embodiment of a vehicle including a system for providing platooning information using a multi-focal plane augmented reality display.

Reference will now be made in detail to several examples of the disclosure that are illustrated in accompanying drawings. Whenever possible, the same or similar reference numerals are used in the drawings and the description to refer to the same or like parts or steps.

With reference to FIG. 1, a host vehicle 10 generally includes a chassis 12, a body 14, front and rear wheels 17 and may be referred to as a vehicle system. In the depicted embodiment, the host vehicle 10 includes two front wheels 17a and two rear wheels 17b. The body 14 is arranged on the chassis 12 and substantially encloses components of the host vehicle 10. The body 14 and the chassis 12 may jointly form a frame. The wheels 17 are each rotationally coupled to the chassis 12 near a respective corner of the body 14. The host vehicle 10 includes a front axle 19 coupled to the front wheels 17a and a rear axle 25 coupled to the rear wheels 17b.

In various embodiments, the host vehicle 10 may be an autonomous vehicle and a control system 98 is incorporated into the host vehicle 10. The control system 98 may be referred to as the system or the system for providing platooning information using one or more displays 29, such as a multi-focal plane augmented reality display. The host vehicle 10 is, for example, a vehicle that is automatically controlled to carry passengers from one location to another. The host vehicle 10 is depicted in the illustrated embodiment as a pickup truck, but it should be appreciated that other vehicles including, trucks, sedans, coupes, sport utility vehicles (SUVs), recreational vehicles (RVs), etc., may also be used. In an embodiment, the host vehicle 10 may be a so-called a Level Two, a Level Three, Level Four, or Level Five automation system. A Level Four system indicates "high automation," referring to the driving mode-specific performance by an automated driving system of aspects of the dynamic driving task, even if a human driver does not respond appropriately to a request to intervene. A Level Five system indicates "full automation," referring to the full-time performance by an automated driving system of aspects of the dynamic driving task under a number of roadway and environmental conditions that can be managed by a human driver. In Level 3 vehicles, the vehicle systems perform the entire dynamic driving task (DDT) within the area that it is designed to do so. The vehicle operator is only expected to be responsible for the DDT-fallback when the host vehicle 10 essentially "asks" the driver to take over if something goes wrong or the vehicle is about to leave the zone where it is able to operate. In Level 2 vehicles, systems provide steering, brake/acceleration support, lane centering, and adaptive cruise control. However, even if these systems are activated, the vehicle operator at the wheel must be driving and constantly supervising the automated features.

As shown, the host vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an electric machine such as a traction motor and/or a fuel cell propulsion system. The host vehicle 10 may further include a battery (or battery pack) 21 electrically connected to the propulsion system 20. Accordingly, the battery 21 is configured to store electrical energy and to provide electrical energy to the propulsion system 20. In certain embodiments, the propulsion system 20 may include an internal combustion engine. The transmission system 22 is configured to transmit power from the propulsion system 20 to the vehicle wheels 17 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 17. The brake system 26 may, in various embodiments, include friction brakes, brake by wire, a regenerative braking system such as an electric machine, and/or other appropriate braking systems. The steering system 24 influences a position of the vehicle wheels 17 and may include a steering wheel 33. While depicted as including a steering wheel 33 for illustrative purposes, in some embodiments contemplated within the scope of the present disclosure, the steering system 24 may not include a steering wheel 33.

The sensor system 28 includes one or more sensors 40 (i.e., sensing devices) that sense observable conditions of the exterior environment and/or the interior environment of the host vehicle 10. The sensors 40 are in communication with the controller 34 and may include, but are not limited to, one or more radars, one or more light detection and ranging (lidar) sensors, one or more proximity sensors, one or more odometers, one or more ground penetrating radar (GPR) sensors, one or more steering angle sensors, one or more global positioning systems (GPS) transceivers 45, one or more tire pressure sensors, one or more cameras 41 (e.g., optical cameras and/or infrared cameras), one or more gyroscopes, one or more accelerometers, one or more inclinometers, one or more speed sensors, one or more ultrasonic sensors, one or more inertial measurement units (IMUs) and/or other sensors. Each sensor 40 is configured to generate a signal that is indicative of the sensed observable conditions of the exterior environment and/or the interior environment of the host vehicle 10. Because the sensor system 28 provides data to the controller 34, the sensor system 28 and its sensors 40 are considered sources of information (or simply sources).

The sensor system 28 includes one or more Global Navigation Satellite System (GNSS) transceivers 45 (e.g., Global Positioning System (GPS) transceivers) configured to detect and monitor the route data (i.e., route information). The GNSS transceiver 45 is configured to communicate with a GNSS to locate the position of the host vehicle 10 in the globe. The GNSS transceiver 45 is in electronic communication with the controller 34.

The actuator system 30 includes one or more actuator devices 42 that control one or more vehicle features such as, but not limited to, the propulsion system 20, the transmission system 22, the steering system 24, and the brake system 26. In various embodiments, the vehicle features may further include interior and/or exterior vehicle features such as, but are not limited to, doors, a trunk, and cabin features such as air, music, lighting, etc.

The data storage device 32 stores data for use in automatically controlling the host vehicle 10. In various embodiments, the data storage device 32 stores defined maps of the navigable environment. In various embodiments, the defined maps may be predefined by and obtained from a remote system. For example, the defined maps may be assembled by the remote system and communicated to the host vehicle 10 (wirelessly and/or in a wired manner) and stored in the data storage device 32. The data storage device 32 may be part of the controller 34, separate from the controller 34, or part of the controller 34 and part of a separate system.

The host vehicle 10 may further include one or more airbags 35 in communication with the controller 34 or another controller of the host vehicle 10. The airbag 35 includes an inflatable bladder and is configured to transition between a stowed configuration and a deployed configuration to cushion the effects of an external force applied to the host vehicle 10. The sensors 40 may include an airbag sensor, such as an IMU, configured to detect an external force and generate a signal indicative of the magnitude of such external force. The controller 34 is configured to command the airbag 35 to deploy based on the signal from one or more sensors 40, such as the airbag sensor. Accordingly, the controller 34 is configured to determine when the airbag 35 has been deployed.

The controller 34 includes at least one processor 44 and a non-transitory computer readable storage device or media 46. The processor 44 may be a custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 34 in controlling the host vehicle 10. The controller 34 of the host vehicle 10 may be referred to as a vehicle controller and may be programmed to execute a method 100 (FIG. 16) as described in detail below.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the host vehicle 10, and generate control signals to the actuator system 30 to automatically control the components of the host vehicle 10 based on the logic, calculations, methods, and/or algorithms. Although a single controller 34 is shown in FIG. 1, embodiments of the host vehicle 10 may include a plurality of controllers 34 that communicate over a suitable communication medium or a combination of communication mediums and that cooperate to process the sensor signals, perform logic, calculations, methods, and/or algorithms, and generate control signals to automatically control features of the host vehicle 10.

Figure 6:
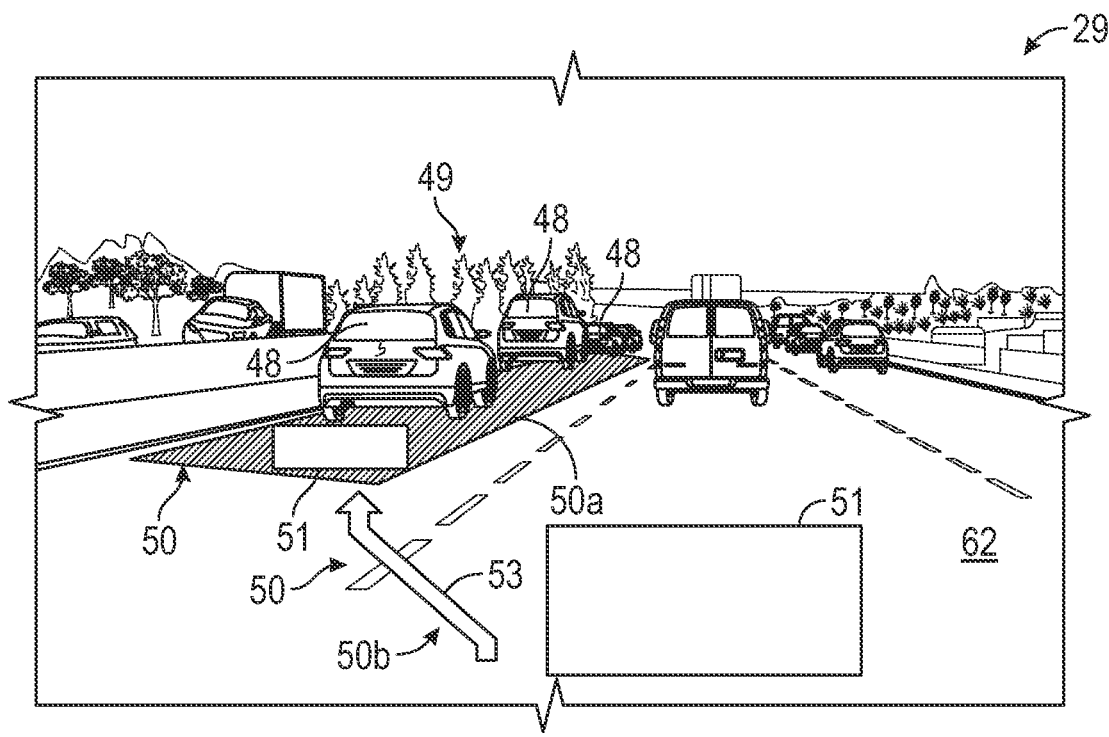
FIG. 6 is a schematic front view of the multi-focal plane augmented reality display of FIG. 1, wherein the multi-focal plane augmented reality display presents information indicating that the host vehicle may will save time if it joins the platoon.

In various embodiments, one or more instructions of the controller 34 are embodied in the control system 98. The host vehicle 10 includes a user interface 23, which may be a touchscreen in the dashboard. The user interface 23 may include, but is not limited to, an alarm, such as one or more speakers 27 to provide an audible sound, haptic feedback in a vehicle seat or other object, one or more displays 29, one or more microphones 31 and/or other devices suitable to provide a notification to the vehicle user of the host vehicle 10. The user interface 23 is in electronic communication with the controller 34 and is configured to receive inputs by a user (e.g., a vehicle operator or a vehicle passenger). For example, the user interface 23 may include a touch screen and/or buttons configured to receive inputs from a vehicle user 11 (FIG. 6). Accordingly, the controller 34 is configured to receive inputs from the user via the user interface 23.

The host vehicle 10 may include one or more displays 29 configured to display information to the user (e.g., vehicle operator or passenger) and may be an augmented reality (AR) display. In the present disclosure, the term "AR display" means a display that presents information to users, while still allowing sight of the outside world. In certain embodiments, the display 29 may be configured as a head-up display (HUD), and/or an information cluster display. Accordingly, the display 29 may be an AR HUD or an AR information cluster display. In an AR HUD, images are projected on a windshield 39 (FIG. 15) of the host vehicle 10. In an AR information cluster display, the information cluster panel of the host vehicle 10 includes a screen that presents an image of the front of the host vehicle 10 captured by one or more cameras 41 (i.e., a forward image) and virtual images presented on that forward image. As discussed below, the display 29 may be a multi-focal plane AR display to facilitate manipulation (e.g., size, location, and type) of the virtual images.

The communication system 36 is in communication with the controller 34 and is configured to wirelessly communicate information to and from other remote vehicles 48, such as but not limited to, other vehicles ("V2V" communication), infrastructure ("V2I" communication), remote systems at a remote call center (e.g., ON-STAR by GENERAL MOTORS) and/or personal electronic devices, such as a mobile phone. In the present disclosure, the term "remote vehicle" means a vehicle, such as a car, configured to transmit one or more signals to the host vehicle 10 while not physically connected to the host vehicle 10. In certain embodiments, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. Accordingly, the communication system 36 may include one or more antennas and/or communication transceivers 37 for receiving and/or transmitting signals, such as cooperative sensing messages (CSMs). The communication transceivers 37 may be considered sensors 40. The communication system 36 is configured to wirelessly communicate information between the host vehicle 10 and another vehicle. Further, the communication system 36 is configured to wirelessly communicate information between the host vehicle 10 and infrastructure or other vehicles.

Figure 2:
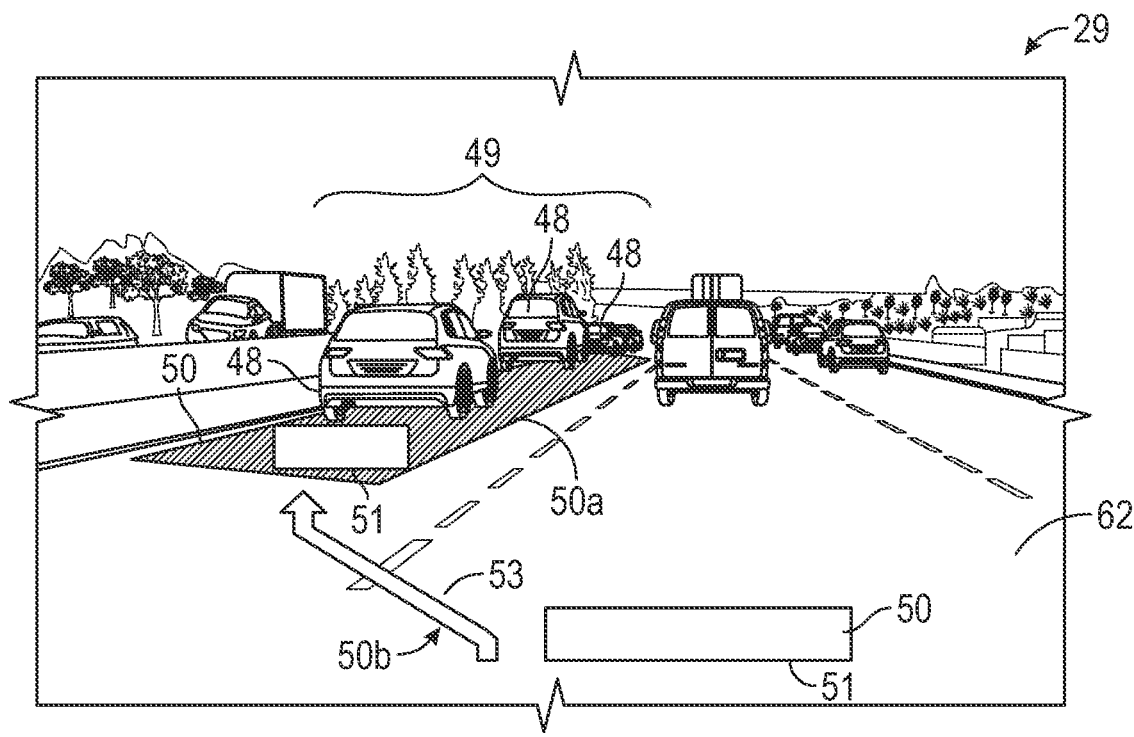
FIG. 2 is a schematic front view of the multi-focal plane augmented reality display of FIG. 1, wherein the multi-focal plane augmented reality display presents a text asking the vehicle user whether to join the platoon.

With reference to FIGS. 1 and 2, the system 98 is configured to command the display 29, such as an AR HUD, an AR information cluster display and/or an information display, to present platooning information from data received from other remote vehicles 48 through the communication system 36 (e.g., V2V communications), and/or eye-tracking data. In doing so, the display 29 shows the platooning information in a contextual manner by augmenting the road scene with conformal graphics. In the present disclosure, the term "conformal graphic" means synthetic generated content (i.e., a virtual image 50) presented as part of the outside world. Accordingly, the display 29 is a conformal display. In the present disclosure, the term "conformal display" means a display that has the ability to represent synthetically generated content (i.e., one or more virtual images 50) as part of the outside world.

With reference to FIG. 2, the display 29 may be configured as a head-up display (HUD) and presents virtual images 50 with information about a platoon 49 of remote vehicles 48. In the depicted example, the display 29 shows a first virtual image 50*a* on the roadway surface 62 that spans (and therefore highlights) the entire length of a platoon 49. The first virtual image 50*a* therefore highlights the remote vehicles 48 that are part of the platoon 49 and may include text 51 indicating the final destination (e.g., Chicago) of the platoon 49. The display 29 may additionally present a second virtual image 50*b* including an arrow 53 and additional text 51 adjacent to the arrow 53. The arrow 53 points toward the platoon 49 (i.e., toward the first virtual image 50*a*) and the text 51 adjacent the arrow 53 is a query, asking the vehicle user 11 of the host vehicle 10 whether he or she wishes to join the platoon 49 (e.g., "Join Platoon?").

Figure 3:
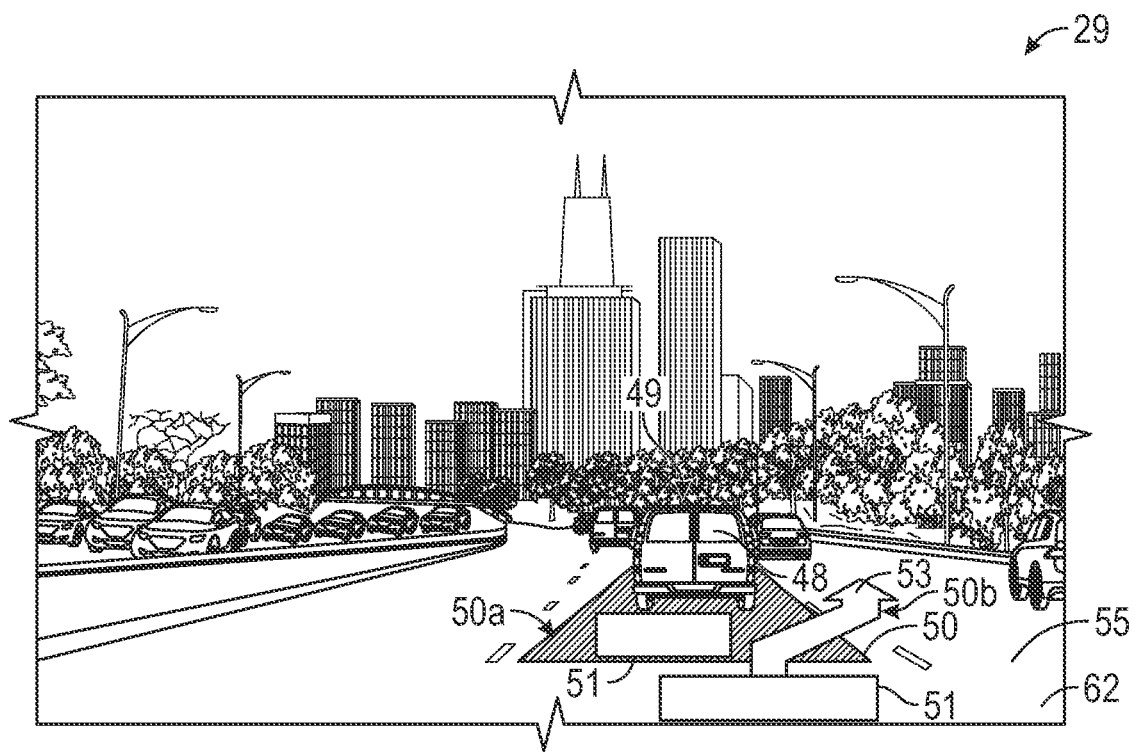
FIG. 3 is a schematic front view of the multi-focal plane augmented reality display of FIG. 1, wherein the multi-focal plane augmented reality display presents a text asking the vehicle user whether to exit the platoon.

In the embodiment depicted in FIG. 3, the first virtual image 50*a* generated by the display 29 on the roadways surface 62 highlights the remote vehicles 48 that are part of the platoon 49 and includes text 51 indicating the final destination (e.g., Chicago) of the platoon 49. The second virtual image 50*b* includes the arrow 53 pointing toward a lane directly adjacent to the platoon 49 (i.e., the adjacent lane 55). In addition, the second virtual image 50*b* includes text 51 that is a query, asking the vehicle user 11 of the host vehicle 10 whether he or she wishes to exit the platoon 49 (e.g., "Exit Platoon?") and move to the adjacent lane 55.

Figure 4:
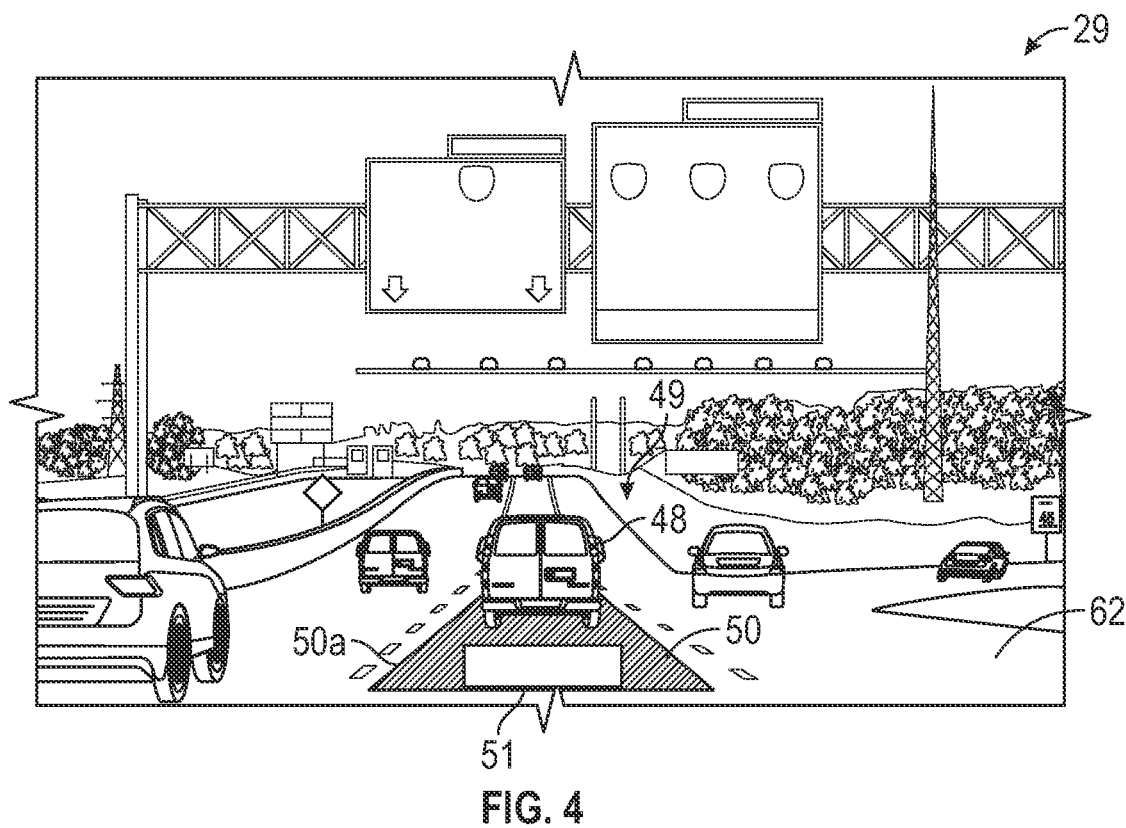
FIG. 4 is a schematic front view of the multi-focal plane augmented reality display of FIG. 1, wherein the multi-focal plane augmented reality display presents information indicating that the host vehicle is part of a platoon heading to a specific destination.

In the embodiment depicted in FIG. 4, the display 29 presents one or more virtual images 50, such as the first virtual image 50*a*. The first virtual image 50*a* spans at least part of the length of the platoon 49. In this case, the host vehicle 10 is part of the platoon 49, and the first virtual image 50*a* includes text 51 indicating the final destination (e.g., Chicago) of the platoon 49. In this case, the host vehicle 10 is part of the platoon 49 but does not lead the platoon 49. For this reason, the first virtual image 50*a* has a rectangular shape. In other words, the first virtual image 50*a* may have a rectangular shape to indicate that the host vehicle 10 is part of the platoon 49 but is not leading the platoon 49.

Figure 5:
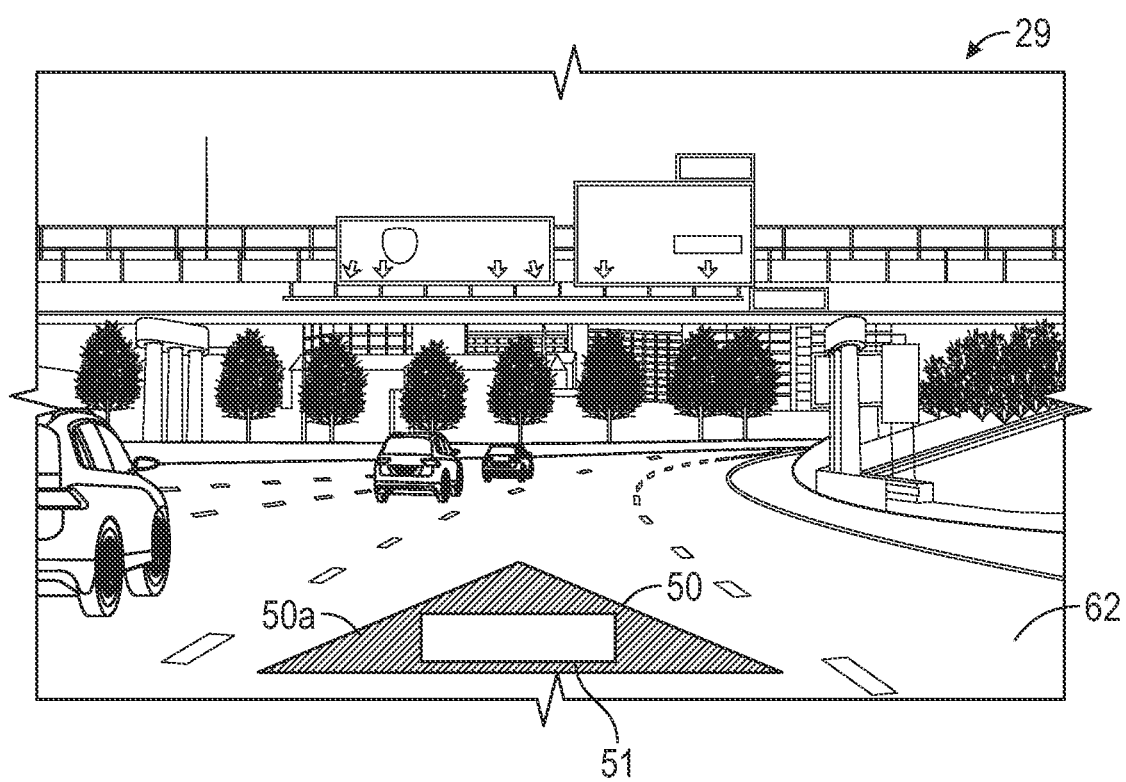
FIG. 5 is a schematic front view of the multi-focal plane augmented reality display of FIG. 1, wherein the multi-focal plane augmented reality display presents information indicating that the host vehicle is leading a platoon heading to a specific destination.

In the embodiment depicted in FIG. 5, the display 29 presents one or more virtual images 50, such as the first virtual image 50*a*. The first virtual image 50*a* is displayed in front of the host vehicle 10 and in front of the platoon 49. In this case, the host vehicle 10 is part of the platoon 49, and the first virtual image 50*a* includes text 51 indicating the final destination (e.g., Kansas City) of the platoon 49. In this case, the host vehicle 10 is part of the platoon 49 and leads the platoon 49. For this reason, the first virtual image 50*a* has a triangular shape. In other words, the first virtual image 50*a* may have a triangular shape to indicate that the host vehicle 10 is part of the platoon 49 and is leading the platoon 49.

In the embodiment depicted in FIG. 6, the display 29 shows a first virtual image 50*a* on the roadway surface 62 that spans (and therefore highlights) the entire length of a platoon 49. The first virtual image 50*a* therefore highlights the remote vehicles 48 that are part of the platoon 49 and may include text 51 indicating the final destination (e.g., Chicago) of the platoon 49. The display 29 may additionally present a second virtual image 50*b* including an arrow 53 and additional text 51 adjacent to the arrow 53. The arrow 53 points toward the platoon 49 (i.e., toward the first virtual image 50*a*) and the text 51 adjacent the arrow 53 includes: (1) the time savings (e.g., 00:17 minutes) to the final destination if the host vehicle 10 joins the platoon 49; and (2) a query, asking the vehicle user 11 of the host vehicle 10 whether he or she wishes to join the platoon 49 (e.g., "Join Platoon?").

Figure 7:
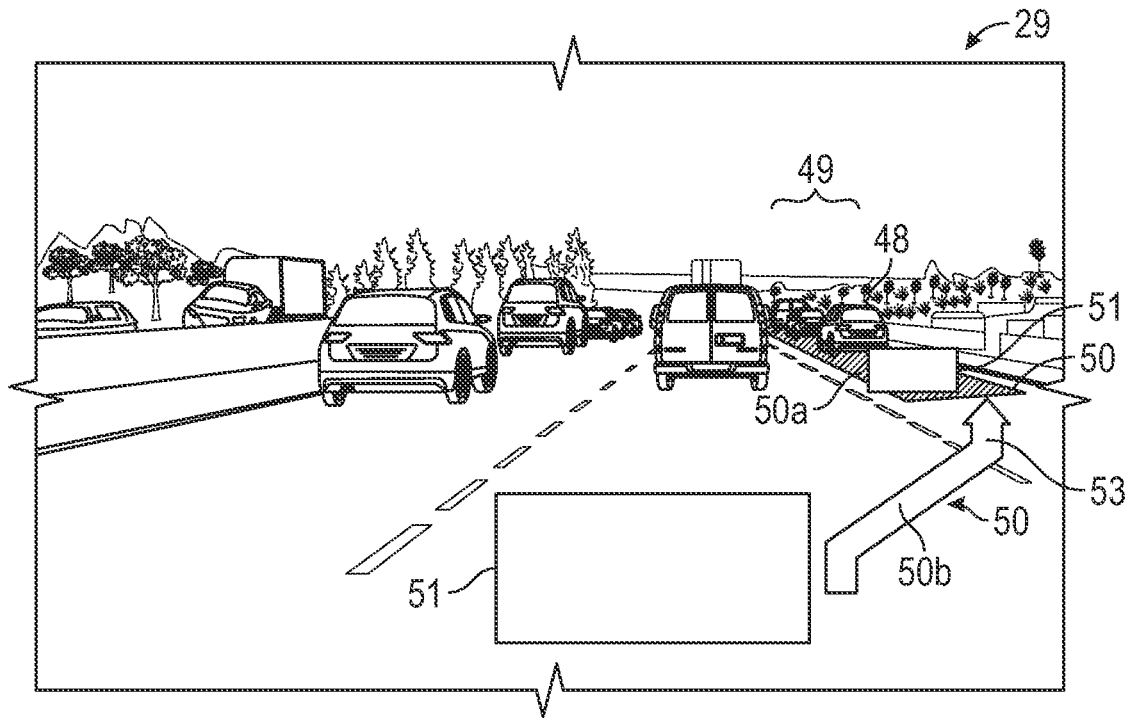
FIG. 7 is a schematic front view of the multi-focal plane augmented reality display of FIG. 1, wherein the multi-focal plane augmented reality display presents information indicating that the host vehicle will benefit from cost savings if it joins the platoon.

In the embodiment depicted in FIG. 7, the display 29 shows a first virtual image 50*a* on the roadway surface 62 that spans (and therefore highlights) the entire length of a platoon 49. The first virtual image 50*a* therefore highlights the remote vehicles 48 that are part of the platoon 49 and may include text 51 indicating the final destination (e.g., Chicago) of the platoon 49. The display 29 may additionally present a second virtual image 50*b* including an arrow 53 and additional text 51 adjacent to the arrow 53. The arrow 53 points toward the platoon 49 (i.e., toward the first virtual image 50*a*) and the text 51 adjacent the arrow 53 includes: (1) the cost savings (e.g., $6.48) to the final destination if the host vehicle 10 joins the platoon 49; and (2) a query, asking the vehicle user of the host vehicle 10 whether he or she wishes to join the platoon 49 (e.g., "Join Platoon?").

Figure 8:
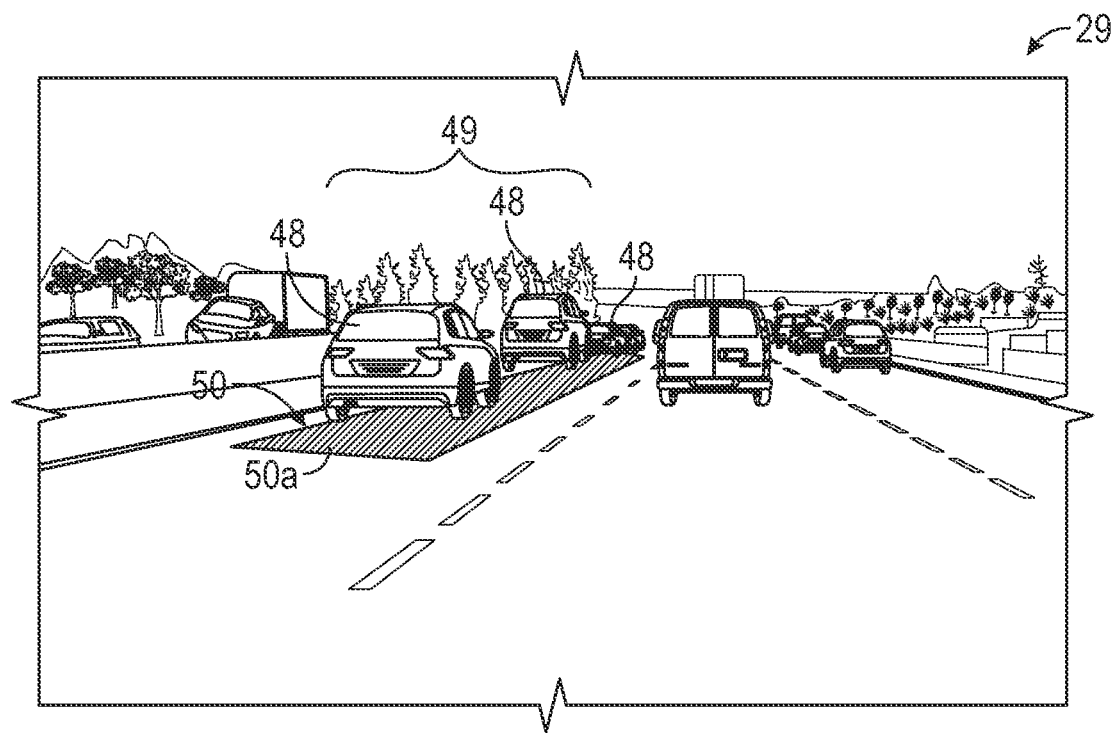
FIG. 8 is a schematic front view of the multi-focal plane augmented reality display of FIG. 1, wherein the multi-focal plane augmented reality display presents information indicating a platoon is private and the host vehicle is not allowed to join the platoon.

In the embodiment depicted in FIG. 8, the display 29 shows a first virtual image 50*a* on the roadway surface 62 that spans (and therefore highlights) the entire length of a platoon 49. The first virtual image 50*a* therefore highlights the remote vehicles 48 that are part of the platoon 49 and may have a bright color (e.g., red) to indicate that the platoon 49 is private and the host vehicle 10 is not allowed to join the platoon 49.

Figure 9:
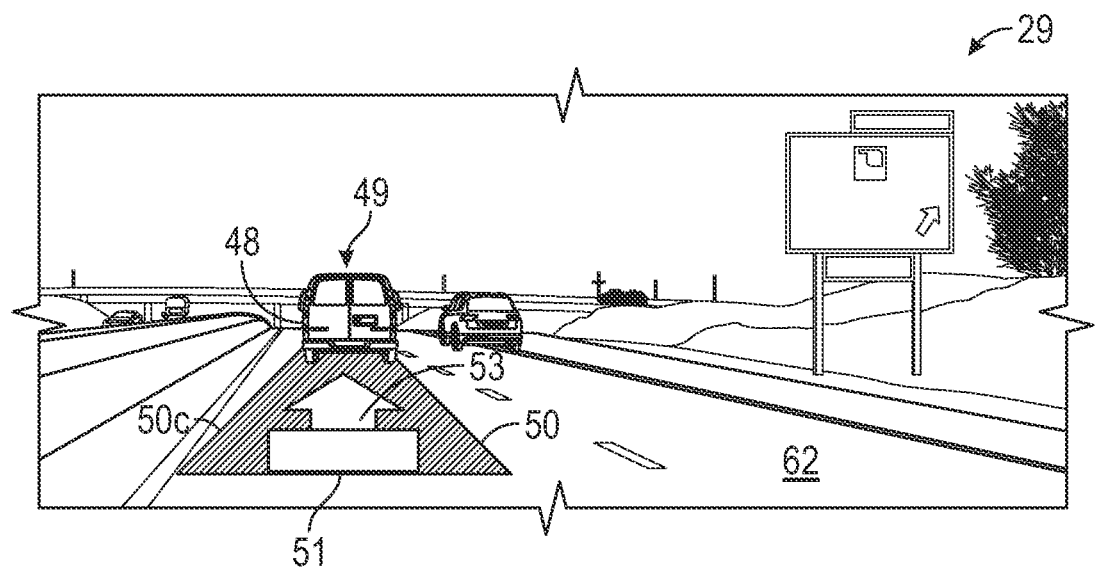
FIG. 9 is a schematic front view of the multi-focal plane augmented reality display of FIG. 1, wherein the multi-focal plane augmented reality display presents information indicating that the host vehicle will close a gap between a platooning vehicle and the host vehicle.

In the embodiment depicted in FIG. 9, the display 29 shows a third virtual image 50*c* on the roadway surface 62 that disposed between the host vehicle 10 and a remote vehicle 48 directly in front of the host vehicle. The third virtual image 50*c* may have a rectangular square that highlights the area between the between the host vehicle 10 and the remote vehicle 48 directly in front of the host vehicle 10 and includes an arrow 53 inside the highlighted area pointing toward the remote vehicle 48 directly in front of the host vehicle 10. The third virtual image 50*c* also includes text 51 (e.g., closing gap) indicating host vehicle 10 will close a gap between the host vehicle 10 and the remote vehicle 48 that is directly in front of the host vehicle 10 because another remote vehicle 48 exited the platoon 49.

Figure 10:
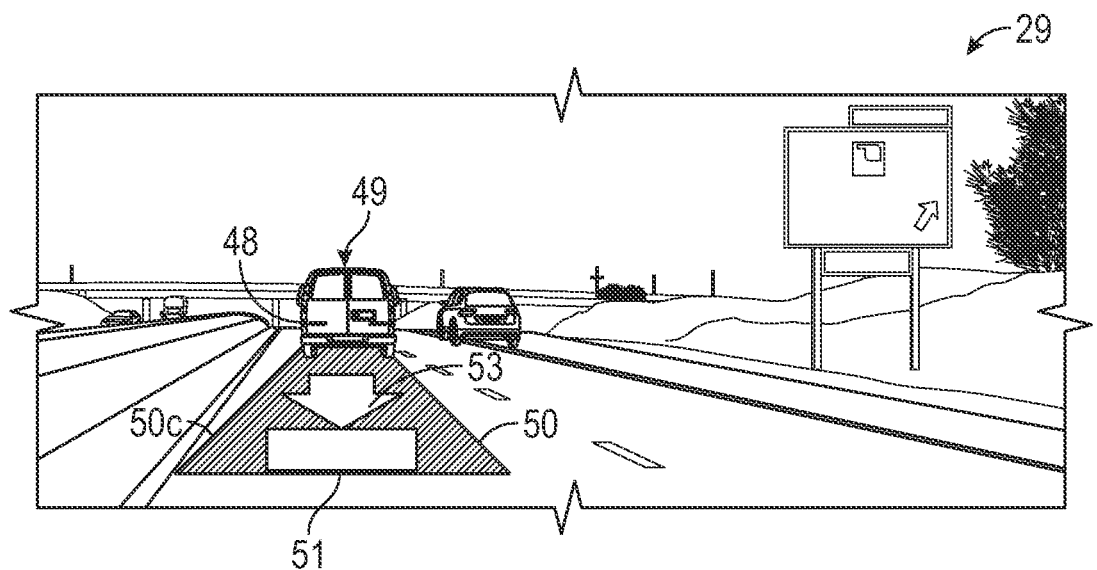
FIG. 10 is a schematic front view of the multi-focal plane augmented reality display of FIG. 1, wherein the multi-focal plane augmented reality display presents information indicating that the host vehicle will open a gap between a platooning vehicle and the host vehicle.

In the embodiment depicted in FIG. 10, the display 29 shows a third virtual image 50*c* on the roadway surface 62 that disposed between the host vehicle 10 and a remote vehicle 48 directly in front of the host vehicle. The third virtual image 50*c* may have a rectangular square that highlights the area between the between the host vehicle 10 and the remote vehicle 48 directly in front of the host vehicle 10 and includes an arrow 53 inside the highlighted area pointing toward the remote vehicle 48 directly in front of the host vehicle 10. The third virtual image 50c also includes text 51 (e.g., closing gap) indicating that the host vehicle 10 will close a gap between the host vehicle 10 and the remote vehicle 48 that is directly in front of the host vehicle 10 to allow another remote vehicle 48 to enter the platoon 49.

Figure 11:
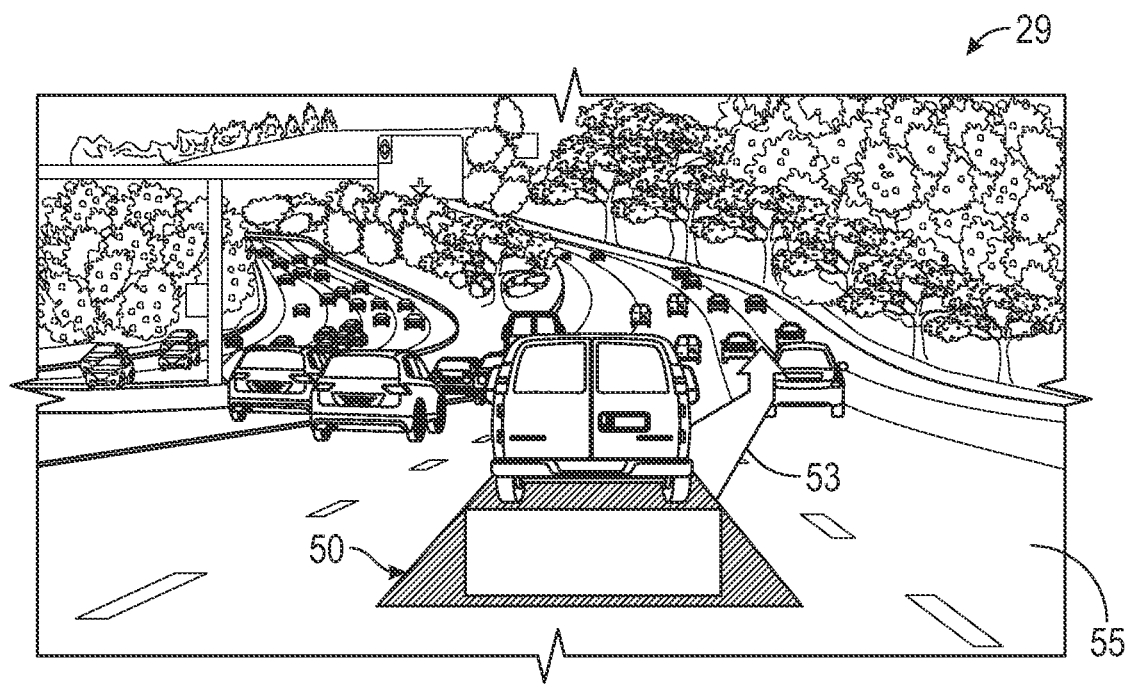
FIG. 11 is a schematic front view of the multi-focal plane augmented reality display of FIG. 1, wherein the multi-focal plane augmented reality display presents information indicating that a platoon that includes the host vehicle will change lanes.

In the embodiment depicted in FIG. 11, the display 29 shows a virtual image 50 on the roadway surface 62. The second virtual image 50b includes the arrow 53 pointing toward a lane directly adjacent to the platoon 49 (i.e., the adjacent lane 55). In addition, the virtual image 50 includes text 51 (e.g., "Platoon Changing Lanes") indicating that the platoon 49, which includes the host vehicle 10, will move to the adjacent lane 55.

Figure 12:
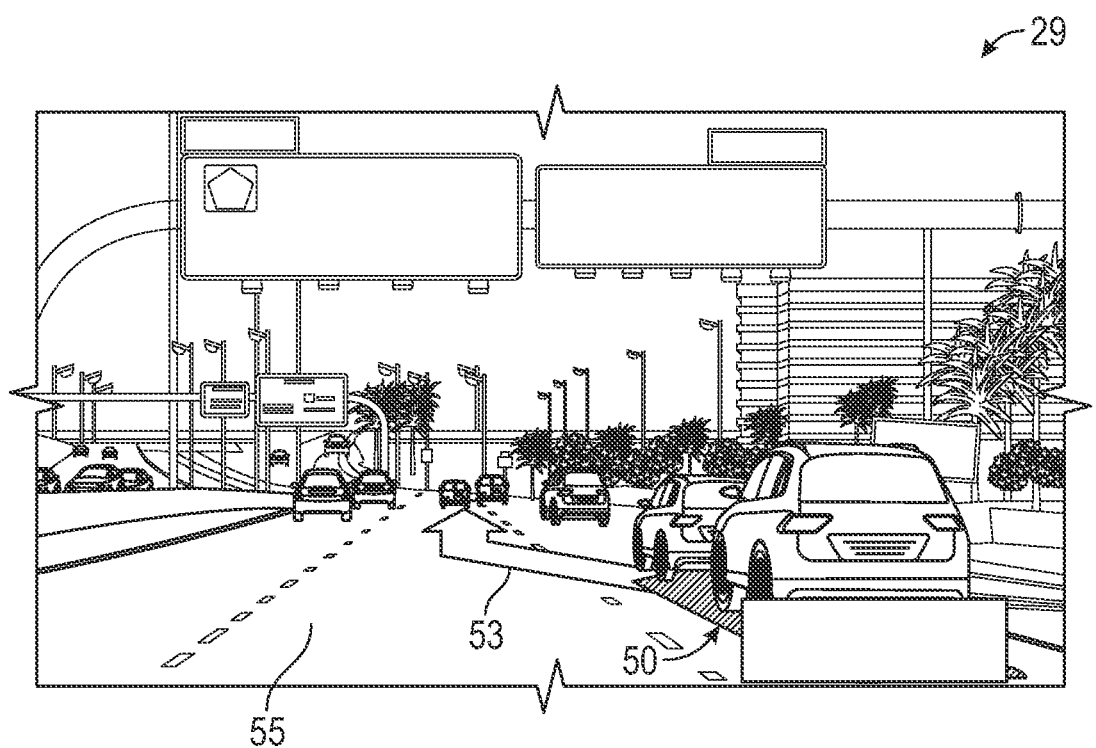
FIG. 12 is a schematic front view of the multi-focal plane augmented reality display of FIG. 1, wherein the multi-focal plane augmented reality display presents information indicating that a platoon that does not include the host vehicle will change lanes.

In the embodiment depicted in FIG. 12, the display 29 shows a virtual image 50 on the roadway surface 62. The second virtual image 50b includes the arrow 53 pointing toward a lane directly adjacent to the platoon 49 (i.e., the adjacent lane 55). In addition, the virtual image 50 includes text 51 (e.g., "Platoon Changing Lanes") indicating that the platoon 49, which does not include the host vehicle 10, will move to the adjacent lane 55.

Figure 13:
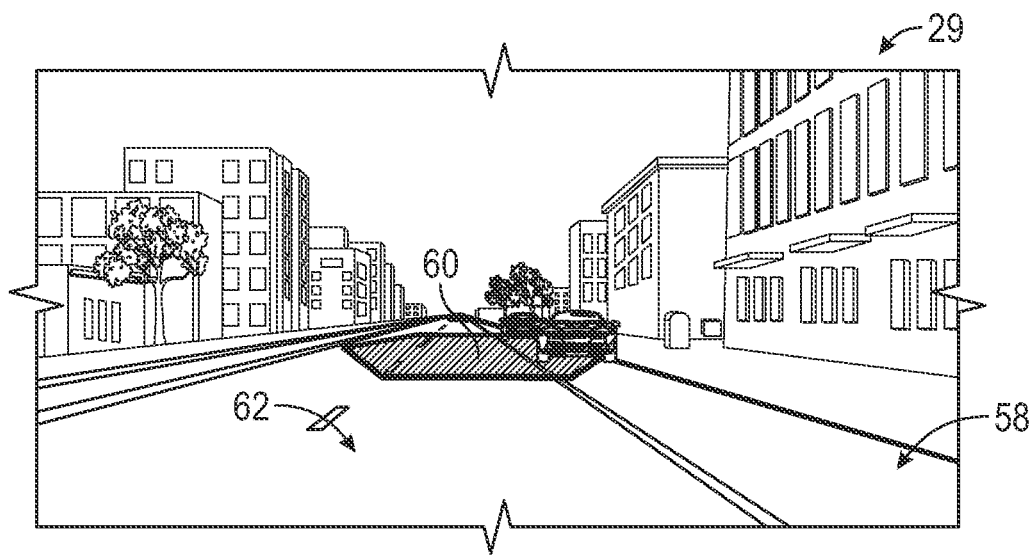
FIG. 13 is a schematic front view of the dual-focal plane augmented reality display of FIG. 1, highlighting a second image plane of the dual-focal plane augmented reality display of FIG. 1.
Figure 14:
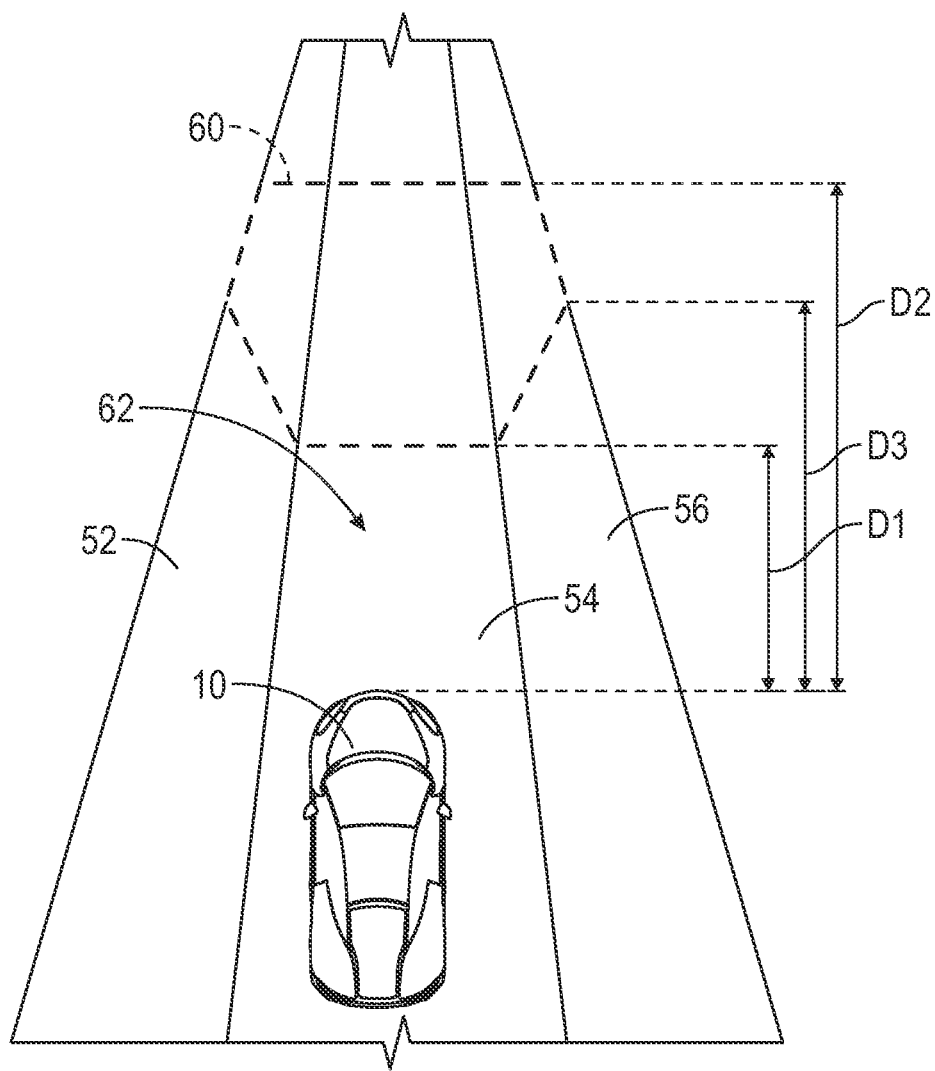
FIG. 14 is a schematic diagram of the second image plane of the dual-focal plane augmented reality display of FIG. 1.

With reference to FIGS. 13 and 14, the display 29 may be a multi-focal plane AR display as mentioned above. In this case, the display 29 has a first image plane 58 and a second image plane 60. The first image plane 58 shows the view of the outside world, and the second image plane 60 is reserved for displaying the virtual images 50 (FIG. 2). The second image plane 60 spans multiple lanes and the virtual images 50 appear at a location farther on the roadway surface 62 relative to the first image plane 58. For instance, as shown in FIG. 14, the second image plane 60 covers the left lane 52, the central lane 54, and the right lane 56. As a non-limiting example, in the central lane 54, the second image plane 60 starts at a first predetermined distance D1 (e.g., twenty-five meters) from the host vehicle 10 and ends at a second predetermined distance D2 (e.g., ninety meters) from the host vehicle 10. Regardless of the specific distances, the second predetermined distance D2 is greater than the first predetermined distance D1 to help the vehicle user 11 (FIG. 15) see the virtual images 50 (FIG. 3). In the left lane 52 and the right lane 56, the second image plane 60 is delimited by a sloped boundary that starts at the first predetermined distance D1 from the host vehicle 10 and ends at a third predetermined distance D3 (e.g., fifty meters) from the host vehicle 10. The third predetermined distance D3 is greater than the first predetermined distance D1 and less than the second predetermined distance D2 to help the vehicle user 11 (FIG. 6) see the virtual images 50 (FIG. 3). As used herein, the term "multi-focal plane AR display" means an AR display that presents images in more than one image plane, wherein the image planes are at different locations. It is desirable to use a multi-focal plane AR display in the presently disclosed system 98 to easily change the size, type, and/or location of the virtual images 50 with respect to the view of the outside world.

Figure 15:
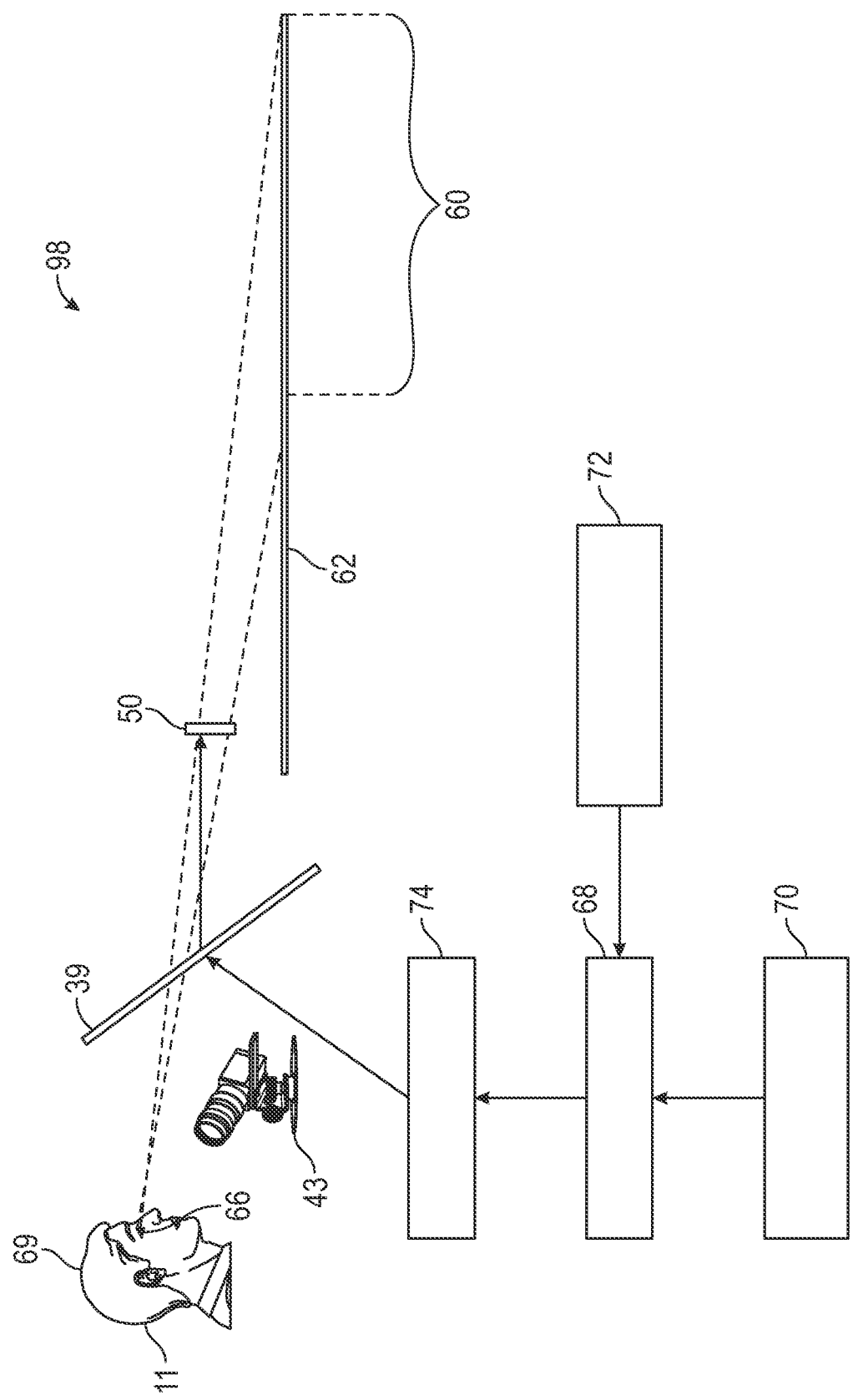
FIG. 15 is a schematic diagram of part of the system for displaying lane information on the dual-focal plane augmented reality display of FIG. 1.

With reference to FIG. 15, the system 98 includes a user tracker 43 (e.g., eye tracker and/or head tracker) configured to track the position and movement of the eyes 66 or the head 69 of the vehicle user 11. In the depicted embodiment, the user tracker may be configured as one or more of cameras 41 of the host vehicle 10. As discussed above, the cameras 41 are considered sensors 40 of the host vehicle 10. As a sensor 40, the user tracker 43 is in communication with the controller 34, which includes a system manager 68. During operation of the system 98, the system manager 68 receives at least a first input 70 and a second input 72. The first input 70 is indicative of the position of the vehicle in space (i.e., the vehicle location in space), and the second input 72 is indicative of the vehicle user position in the host vehicle 10 (e.g., the position of the eyes and/or head of the user in the host vehicle 10). The first input 70 may include data such as GNSS data (e.g., GPS data), vehicle speed roadway curvature, and vehicle steering, and this data may be collected from the sensors 40 of the host vehicle 10 and/or other remote vehicles 48 through the communication system 36 of the host vehicle 10. The second input 72 may be received from the user tracker (e.g., eye tracker and/or head tracker). The system manager 68 is configured to determine (e.g., compute) the type, size, shape, and color of the conformal graphics (i.e., virtual images 50) based on the first input 70 (i.e., the vehicle location in space), the second input 72 (e.g., the position of the eyes and/or head of the user in the host vehicle 10), and the sensed vehicle driving environment (which may be obtained through the sensors 40). The type, size, shape, and color of the conformal graphics of the virtual image 50 may be collectively referred to as the virtual image characteristics.

With continued reference to FIG. 15, the system 98 further includes an image engine 74, which is part of the display 29, and may be an integrated circuit configured to generate the virtual images 50. These generated virtual images 50 are then projected on the windshield 39 (if the display 29 is a HUD) to show the virtual images 50 on the second image plane 60 along the roadway surface 62.

Figure 16:
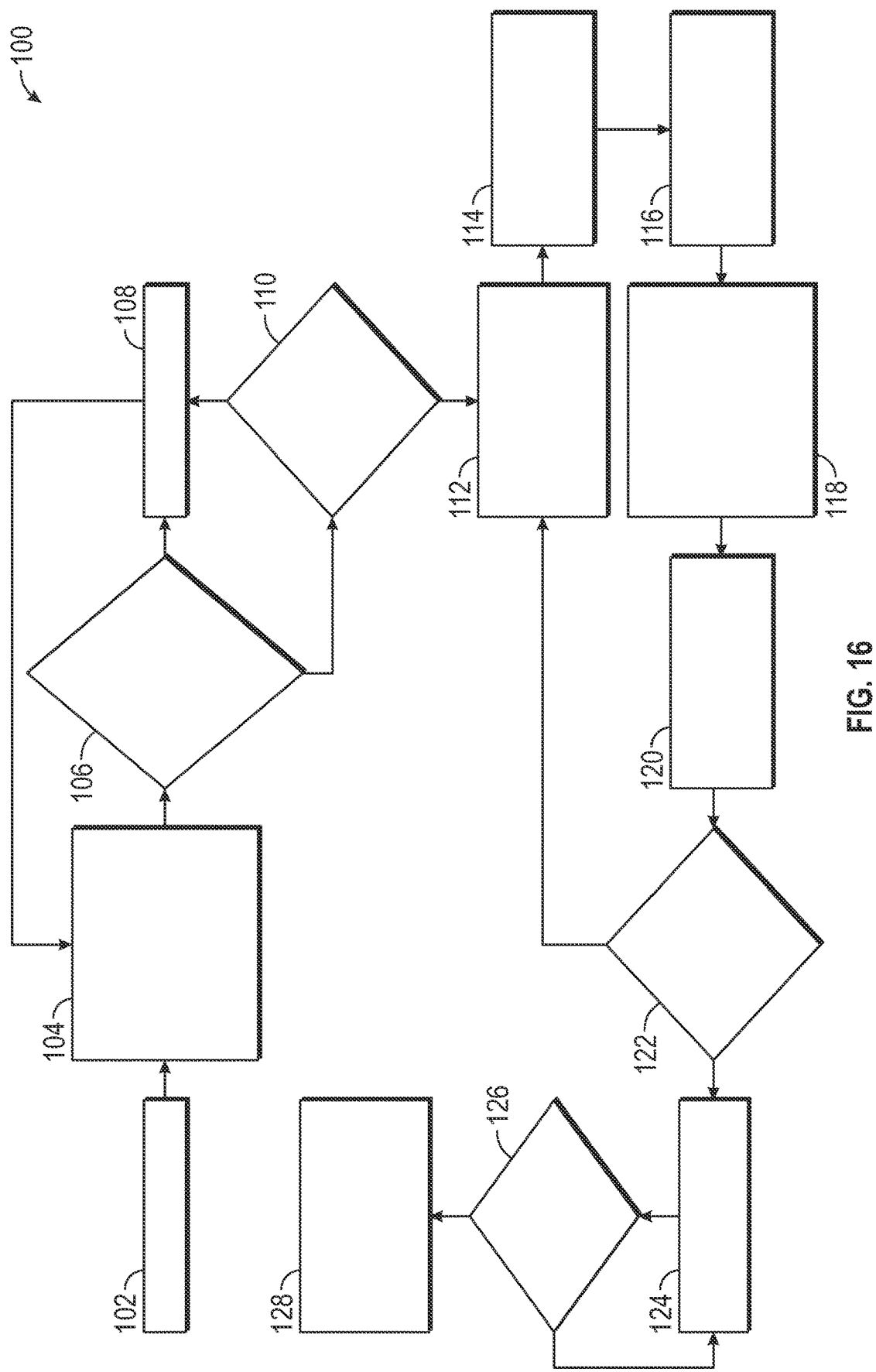
FIG. 16 is a flowchart of a method for providing platooning information using a multi-focal plane augmented reality display.

FIG. 16 is a flowchart of the method 100 for providing platooning information using the display 29, such as the multi-focal plane augmented reality display and/or the information display. The method 100 begins at block 102, in which the controller 34 determines that the host vehicle 10 is being driven using, for example, signals generated by the sensors 40. For example, the controller 34 may receive data from one of the sensors 40, such as a speed sensor, to determine that the host vehicle 10 is moving. Then, the method 100 proceeds to block 104.

At block 104, the controller 34 receives platooning data from, for example, the remote vehicles 48 that are part of the platoon 49. As discussed above, the term "platooning" means a method of autonomously driving a group of vehicles together to a common destination. The term "platooning data" means data about the remote vehicles 48 that are part of the platoon 49 and about the platoon 49 itself. In certain embodiments, the platooning data includes the movements, speed, trajectory, headways, acceleration, location relative to the host vehicle 10, destination of one or more of the remote vehicles 48 that are part of the platoon 49. To obtain the platooning data, the controller 34 may receive at least one signal from one or more sensors 40, such as cameras 41, GNSS transceivers 45 (e.g., Global Positioning System (GPS) transceivers), data from the Internet, roadway databases and/or data from the other remote vehicles 48, such as remote vehicles 48, via the communication transceivers 37 using, for example, V2V communication. The controller 34 may therefore determine the location, movements, and headways, trajectories of the remote vehicles 48 that are part of the platoon 49 using, for example, the platooning data received from the GNSS transceiver 45, another sensor 40, or another suitable source of information, such as the remote vehicles 48. At block 104, the controller 34 may also determine the location of the host vehicle 10 relative to the remote vehicles 48 that are part of the platoon 49 using at least one signal from one or more sensors 40, such as cameras 41, GNSS transceivers 45 (e.g., Global Positioning System (GPS) transceivers), data from the Internet, roadway databases and/or data from the other remote vehicles 48, such as remote vehicles 48, via the communication transceivers 37. The method 100 then proceeds to block 106.

At block 106, the controller 34 determines whether a platoon 49 is within a predetermined distance from the host vehicle 10 using the platooning data. The predetermined distance may be determined by testing the host vehicle 10. In some embodiments, the predetermined distance may be twenty feet to allow a vehicle user 11 with 20/20 vision to perform an action (e.g., join a platoon 49) when the host vehicle 10 is within twenty feet from a platoon 49. If the distance from the host vehicle 10 to a platoon 49 is greater than the predetermined distance, then the method 100 proceeds to block 108. At block 108, the controller 34 does not perform an action and the method 100 returns to block 104. If the distance from the host vehicle 10 to a platoon 9 is equal to or less than the predetermined distance, then the method 100 continues to block 110.

At block 110, the controller 34 determines whether the goals of the vehicle user 11 of the host vehicle 10 are consistent (or aligned) a platooning action relating to one or more platoons 49 within the predetermined distance from the host vehicle 10. To do so, the controller 34 may receive user preferences or goals inputted by the vehicle user 11 through the user interface 23. In other words, at block 110, the controller 34 receives vehicle-user goal data from the vehicle user 11 of the host vehicle 10. In the present disclosure, the term "vehicle-user goal data" means data about the goals of the vehicle user 11 of the host vehicle 10, wherein the goals relate to one or more platoons 49 within a predetermined distance from the host vehicle 10. As non-limiting examples, the goals of the vehicle user 11 may include: reaching a particular final destination (e.g., Chicago), reaching a particular final destination in the timeliest manner; and reaching a particular final destination while minimizing costs (e.g., saving fuel). At block 110, the controller 34 determines whether the goals of the vehicle user 11 of the host vehicle 10 are consistent (or aligned) a platooning action relating to one or more platoons 49 within the predetermined distance from the host vehicle 10. As a non-limiting example, the final destination of a platoon 49 within the predetermined distance from the host vehicle 10 may be City A (e.g., Chicago), and the final destination of the vehicle user 11 may be City A or another city along the route of the platoon 49 to reach City A. In this case, the controller 34 determines that joining the platoon 49 heading to City A (i.e., platooning action) is consistent with the vehicle user goals. In another example, the vehicle user 11 may input his or her goals as maximizing time savings to reach to City A or minimizing costs to reach City A. If the controller 34 determines that joining a platoon 49 heading to City A (i.e., platooning action) maximizes time savings or minimizes costs (depending on the preference of the vehicle user 11), then the controller 34 determines that joining the platoon 49 (i.e., platooning action) is consistent with the goals of the vehicle user 11 of the host vehicle 10. If the controller 34 determines that one or more platooning actions relating to one or more platoons 49 within the predetermined distance from the host vehicle 10 are not consistent with the goals of the vehicle user 11 of the host vehicle 10, then the method 100 returns to block 108. If the controller 34 determines that the goals of the vehicle user 11 of the host vehicle 10 are consistent (or aligned) a platooning action relating to one or more platoons 49 within the predetermined distance from the host vehicle 10, then the method 100 returns to block 112.

At block 112, the controller 34 determines the position (or location) of the host vehicle 10 relative to the platoon 49 that is aligned with the goals of the vehicle user 11. To do so, the controller 34 may use data received from GNSS transceiver 45 and/or roadway data, such as roadway databases. Stated differently, at block 112, the controller 34 determines where the host vehicle 10 is located with respect to one or more of the remote vehicles 48 that are part of the platoon 49 that is within the predetermined distance from the host vehicle 10 and that are aligned with the goals of the vehicle user 11 (e.g., platoons 49 heading to the same final destination as the host vehicle 10, cost savings, time savings, etc.). Then, the method 100 continues to block 114.

At block 114, the controller 34 determines the virtual image 50 or virtual images 50 that should be displayed based on the movements, location, headway, and trajectory of the platoon 49, the goals of the vehicle user 11 of the host vehicle 10 and the location of the host vehicle 10 relative to the platoon 49. As non-limiting examples, the virtual images 50 may be indicative that: the host vehicle 10 is leading the platoon 49; the host vehicle 10 is participating in the platoon 49; the final destination of the platoon 49; the platoon 49 is private and therefore the host vehicle 10 is not allowed to join the platoon 49; each of the remote vehicles 48 that are part of the platoon 49 will change lanes; the host vehicle 10, which is part of the platoon 49, will open a gap between the host vehicle 10 and a remote vehicle 48 that is part of the platoon 49 and is directly in front of the host vehicle 10 to allow another remote vehicle 48 that is not part of the platoon 49 to join the platoon 49; the host vehicle 10, which is part of the platoon 49, will close a gap between the host vehicle 10 and a remote vehicle 48 that is part of the platoon 49 and is directly in front of the host vehicle 10 after another remote vehicle 48 exits the platoon 49; and/or a query asking the vehicle user 11 of the host vehicle 10 whether the vehicle user 11 wants to join the platoon 49; time savings achieved by joining a platoon 49; cost savings achieved by joining a platoon 49; and/or another platooning action. In the present disclosure, the term "platooning action" means a movement by (or a location of) one or more of the remote vehicles 48 that are part of the platoon 49; a present or future movement by (or a location of) the host vehicle 10 when the host vehicle 10 is part of the platoon 49; a present or future movement by the host vehicle 10 relative a platoon 49 when the host vehicle 10 is within a predetermined distance from the host vehicle 10 and the host vehicle 10 is not part of the platoon 49; a final destination of the platoon 49; cost or time savings if the host vehicle 10 joins a platoon 49; and/or restrictions about the platoon 49, such as whether the platoon 49 is private.

At block 116, the controller 34 determines the location of the eyes 66 and/or the head 69 of the user of the host vehicle 10 using at least one input from the user tracker 43. As discussed above, the user tracker 43 may be a camera 41 configured to track the movements of the head 69 and/or the eyes 66 of the vehicle user. The controller 34 then uses the inputs from the user tracker 43 to continuously determine, in real time, the location of the eyes 66 and/or the head 69 of the user of the host vehicle 10. The method 100 then proceeds to block 118.

At block 118, the controller 34 determines, in real time, the location, type, size, shape, and color of the virtual image 50 (FIG. 2) to be displayed on the display 29 (e.g., the multi-focal plane augmented reality display) based on the location of the eyes 66 and/or the head 69 of the user of the host vehicle 10, the platooning data, and/or the location of the host vehicle 10 relative to the location of the platoon 49. As a non-limiting example, the location of the virtual image 50 in the display 29 may change as the vehicle user 11 moves the head 69 and/or eyes 66. Further, the size of the virtual images 50 may increase as the host vehicle 10 gets closer to the platoon 49. Next, the method 100 proceeds to block 120.

At block 120, the controller 34 transmits a command signal to command the display 29 to present at least one virtual image 50 at the locations previously determined at block 118. As discussed above, the virtual image 50 is indicative of one or more platooning actions. The location of the virtual images 50 may change in real time based on location of the eyes 66 and/or the head 69 of the vehicle user. In response to receiving the command signal from the controller 34, the display 29 shows the virtual image 50 at the previously determined location with the previously determined size.

At block 122, the controller 34 determines whether the host vehicle 10 has completed the platooning action (e.g., enter a platoon 49) that was presented as a virtual image 50 on the display 29. To do so, the controller 34 determines may receive sensor data from the sensors 40, such as a camera 41, and determine whether the host vehicle 10 has completed the platooning action (e.g., enter a platoon 49, exit a platoon 49, etc.) using the sensor data. If the platooning action has not been completed, then the method 100 returns to block 112. If the platooning action has been completed, then the method 100 proceeds to block 124. The controller 34 also transmits an off signal to the display 29 to stop showing the virtual image 50 indicative of the platooning action that has been completed.

At block 124, the controller 34 receives updates from sensors 40, the user tracker 43, GNSS transceivers 45 (e.g., Global Positioning System (GPS) transceivers), data from the Internet, roadway databases and/or data from the other remote vehicles 48, such as remote vehicles 48, via the communication transceivers 37 using, for example, V2V communication. These updates may relate to the movements of the host vehicle 10 and/or the platoon 49. Then, the method 100 continues to block 126.

At block 126, the controller 34 determines whether the vehicle user 11 has asked to exit the platoon 49. To do so, the controller 34 may rely on inputs from the vehicle user 11. For example, the vehicle user 11 may ask the controller 34 to exit the platoon 49 through the user interface 23. Then, the method 100 continues to block 128.

At block 128, the controller 34 present a virtual image 50 including a query. The query asks the vehicle user 11 of the host vehicle 10 whether the vehicle user wants to exit the platoon 49. If the vehicle user 11 answer in the affirmative (through user interface 23), then the host vehicle 10 may autonomously exit the platoon 49.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for providing platooning information using a multifocal plane augmented reality display of a host vehicle, comprising:
receiving platooning data from at least one of a plurality of remote vehicles, wherein each of the plurality of remote vehicles is part of a platoon, the platooning data includes locations, trajectories, and headways of each of the plurality of remote vehicles, and the platoon has a length spanning along all of the plurality of remote vehicles;
determining whether the platoon is within a predetermined distance from the host vehicle using the platooning data;
in response to determining that the platoon is within the predetermined distance from the host vehicle using the platooning data, transmitting a command signal to the multi-focal plane augmented reality display of the host vehicle to display a virtual image on the multifocal plane augmented reality display, wherein the virtual image is indicative of a platooning action related to the platoon that is within the predetermined distance from the host vehicle, and the virtual image spans along an entirety of the length of the platoon to highlight the entirety of the length of the platoon;
receiving a vehicle-user goal data from a vehicle user of the host vehicle, wherein the vehicle-user goal data includes information about a goal of the vehicle user of the host vehicle;
in response to determining that the platoon is within the predetermined distance from the host vehicle using the platooning data, determining whether performing the platooning action is consistent the goal of the vehicle user of the host vehicle;
in response to determining that the platooning action is consistent with the goal of the vehicle user, commanding the multi-focal plane augmented reality display of the host vehicle to display the virtual image, wherein the virtual image includes a query asking the vehicle user whether to perform the platooning action; and
wherein the multi-focal plane augmented reality display has a first image plane and a second image plane, the first image plane shows a view of the outside world, the second image plane is reserved for displaying the virtual image, the second image plane spans a plurality of lanes of a roadway, the roadway has a roadway surface, the virtual image appears at a location farther on the roadway surface relative to the first image plane, the plurality of lanes includes a left lane, a central lane, and a right lane, the second image plane covers the left lane, the central lane, and the right lane;
wherein, in the central lane, the second image plane starts at a first predetermined distance from the host vehicle and ends at a second predetermined distance from the host vehicle, the second predetermined distance is greater than the first predetermined distance; and
wherein, in the left lane and the right lane, the second image plane is delimited by a sloped boundary that starts at the first predetermined distance from the host vehicle and ends at a third predetermined distance from the host vehicle, and the third predetermined distance is greater than the first predetermined distance and less than the second predetermined distance;
performing, by the host vehicle, the platooning action.

2. The method of claim 1, wherein the virtual image is indicative that the host vehicle is leading the platoon.

3. The method of claim 1, wherein the virtual image is indicative that the host vehicle is participating in the platoon.

4. The method of claim 1, wherein the virtual image is indicative of a final destination of the platoon.

5. The method of claim 1, wherein the virtual image is indicative of the platooning action that will be performed by each of the plurality of remote vehicles.

6. The method of claim 5, wherein the platooning action is that each of the plurality of remote vehicles of the platoon will change lanes.

7. The method of claim 5, wherein the platooning action is that the host vehicle will close a gap between the host vehicle and one of the plurality of remote vehicles that is directly in front of the host vehicle.

8. The method of claim 5, wherein the platooning action is that the host vehicle will open a gap between the host vehicle and one of the plurality of remote vehicles that is directly in front of the host vehicle.

9. The method of claim 1, wherein the virtual image is indicative that the platoon is private and the host vehicle is not allowed to join the platoon.

10. The method of claim 1, wherein the virtual image includes the query, and the query asks the vehicle user of the host vehicle whether the vehicle user wants to join the platoon.

11. The method of claim 1, wherein the virtual image includes the query, and the query asks the vehicle user of the host vehicle whether the vehicle user wants to exit the platoon.

12. The method of claim 1, wherein the virtual image includes a text indicating time savings associated with joining the platoon.

13. The method of claim 1, wherein the virtual image includes a text indicating cost savings associated with joining the platoon.

14. The method of claim 1, further comprising:
determining a location of eyes of the vehicle user of the host vehicle; and
determining a location of the virtual image based on the location of the eyes of the vehicle user;
wherein transmitting the command signal to the multi-focal plane augmented reality display includes commanding the multi-focal plane augmented reality display of the host vehicle to display the virtual image at the location determined based on the location of the eyes of the vehicle user.

15. The method of claim 1, further comprising:
after transmitting the command signal to the multi-focal plane augmented reality display of the host vehicle to display the virtual image on the multi-focal plane augmented reality display, determining whether the host vehicle has completed the platooning action;
and in response to determining that the host vehicle has completed the platooning action, transmitting an off signal to the multi-focal plane augmented reality display to discontinue showing the virtual image on the multi-focal plane augmented reality display.

16. A system for providing platooning information in a host vehicle, comprising:
a user tracker configured to track a location of eyes of a vehicle user of the host vehicle;
a user interface;

a transceiver configured to receive platooning data from at least one of a plurality of remote vehicles, wherein each of the plurality of remote vehicle is part of a platoon, the platoon has a length spanning along all of the plurality of remote vehicles, the platooning data includes locations, trajectories, and headways of each of the plurality of remote vehicles;

a multi-focal plane augmented reality display configured to display a virtual image;

a controller in communication with the transceiver and the multi-focal plane augmented reality display, wherein the controller is configured to:

receive the platooning data;

determine whether the platoon is within a predetermined distance from the host vehicle using the platooning data;

determine the location of eyes of the vehicle user of the host vehicle;

determine a location of the virtual image based on the location of the eyes of the vehicle user;

in response to determining that the platoon is within the predetermined distance from the host vehicle using the platooning data, transmit a command signal to the multi-focal plane augmented reality display of the host vehicle to display the virtual image on the multi-focal plane augmented reality display, wherein the virtual image is indicative of a platooning action related to the platoon that is within the predetermined distance from the host vehicle, and the virtual image spans along an entirety of the length of the platoon to highlight the entirety of the length of the platoon;

command the multi-focal plane augmented reality display of the host vehicle to display the virtual image at the location determined based on the location of the eyes of the vehicle user;

receive a vehicle-user goal data from the vehicle user of the host vehicle via the user interface, wherein the vehicle-user goal data includes information about a goal of the vehicle user of the host vehicle;

in response to determining that the platoon is within the predetermined distance from the host vehicle using the platooning data, determine whether performing the platooning action is consistent with the goal of the vehicle user;

in response to determining that platooning action is consistent the goal of the vehicle user of the host vehicle, command the multi-focal plane augmented reality display of the host vehicle to display the virtual image, wherein the virtual image includes a query asking the vehicle user whether to perform the platooning action;

wherein the multi-focal plane augmented reality display has a first image plane and a second image plane, the first image plane shows a view of the outside world, the second image plane is reserved for displaying the virtual image, the second image plane spans a plurality of lanes of a roadway, the roadway has a roadway surface, the virtual image appears at a location farther on the roadway surface relative to the first image plane, the plurality of lanes includes a left lane, a central lane, and a right lane, the second image plane covers the left lane, the central lane, and the right lane;

wherein, in the central lane, the second image plane starts at a first predetermined distance from the host vehicle and ends at a second predetermined distance from the host vehicle, the first predetermined distance is twenty-five meters, the second predetermined distance is ninety meters, the second predetermined distance is greater than the first predetermined distance;

and wherein, in the left lane and the right lane, the second image plane is delimited by a sloped boundary that starts at the first predetermined distance from the host vehicle and ends at a third predetermined distance from the host vehicle, the third predetermined distance is fifty meters, and the third predetermined distance is greater than the first predetermined distance and less than the second predetermined distance; and command the host vehicle to perform the platooning action.

17. The system of claim 16, wherein the controller is configured to:

after transmitting the command signal to the multi-focal plane augmented reality display of the host vehicle to display the virtual image on the multi-focal plane augmented reality display, determine whether the host vehicle has completed the platooning action; and in response to determining that the host vehicle has completed the platooning action, transmit an off signal to the multi-focal plane augmented reality display to discontinue showing the virtual image on the multi-focal plane augmented reality display.

* * * * *